United States Patent
Homer, Sr.

(10) Patent No.: US 6,626,748 B2
(45) Date of Patent: Sep. 30, 2003

(54) BIG GAME HOIST AND CARRIER ASSEMBLY

(76) Inventor: Paul A. Homer, Sr., 82 S. Riverview Dr., East Peoria, IL (US) 61611

( * ) Notice: Subject to any disclaimer, the term of this patent is extended or adjusted under 35 U.S.C. 154(b) by 0 days.

(21) Appl. No.: 09/981,036

(22) Filed: Oct. 16, 2001

(65) Prior Publication Data

US 2002/0045417 A1 Apr. 18, 2002

Related U.S. Application Data

(60) Provisional application No. 60/241,311, filed on Oct. 18, 2000.

(51) Int. Cl.[7] ............................................... A22B 1/00
(52) U.S. Cl. ...................... 452/189; 452/192; 414/540
(58) Field of Search ............................... 452/189, 187, 452/194; 414/540, 543; 212/180; 280/763.1, 769

(56) References Cited

U.S. PATENT DOCUMENTS

| | | | |
|---|---|---|---|
| 1,311,779 A | * 7/1919 | Shank | 452/189 |
| 4,300,706 A | * 11/1981 | Hendrick et al. | 224/31 |
| D274,036 S | 5/1984 | Schraml | D8/370 |
| 4,615,077 A | 10/1986 | Beebe | 17/44.2 |
| 4,763,942 A | 8/1988 | Lyon | 294/79 |
| 4,909,555 A | 3/1990 | Blasi | 294/79 |
| 5,049,110 A | 9/1991 | Owens | 452/187 |
| 5,071,389 A | 12/1991 | Castle et al. | 452/192 |
| 5,211,526 A | * 5/1993 | Robinette | 414/550 |
| 5,263,675 A | 11/1993 | Roberts et al. | 248/219.4 |
| 5,288,265 A | 2/1994 | Beason et al. | 452/192 |
| D345,780 S | 4/1994 | Ream | D22/199 |
| 5,304,091 A | 4/1994 | Wilkinson | 452/192 |
| 5,439,152 A | * 8/1995 | Campbell | 224/405 |
| 5,451,080 A | * 9/1995 | Kneile | 248/354.1 |
| 5,562,534 A | 10/1996 | McGough | 452/187 |
| 5,588,907 A | * 12/1996 | DePietro et al. | 452/189 |
| 5,591,077 A | 1/1997 | Rowe | 452/189 |
| 5,662,451 A | 9/1997 | Muzzi et al. | 414/540 |
| 5,788,095 A | * 8/1998 | Watson | 212/180 |
| 5,791,858 A | 8/1998 | Sasser | 414/462 |
| D399,415 S | 10/1998 | Gay | D8/370 |
| 5,820,455 A | 10/1998 | Breedlove | 452/187 |
| 5,842,443 A | 12/1998 | Steinfort | 119/726 |
| 5,873,776 A | 2/1999 | Klepac | 452/191 |
| 5,876,019 A | * 3/1999 | Morrissey et al. | 254/323 |
| 5,878,929 A | * 3/1999 | Leonard | 224/401 |
| 5,938,521 A | 8/1999 | Jasek et al. | 452/192 |
| 5,975,831 A | 11/1999 | Martin | 414/543 |
| 6,015,339 A | 1/2000 | Lochbrunner et al. | 452/187 |
| 6,027,405 A | 2/2000 | Leining et al. | 452/160 |
| 6,045,442 A | 4/2000 | Bounds | 452/187 |
| 6,062,974 A | 5/2000 | Williams | 452/187 |
| 6,138,991 A | 10/2000 | Myers, Jr. | 254/323 |
| 6,155,771 A | 12/2000 | Montz | 414/543 |
| 6,186,882 B1 | 2/2001 | Adams et al. | 452/189 |
| 6,231,030 B1 | * 5/2001 | Smith | 254/324 |
| 6,250,483 B1 | * 6/2001 | Frommer | 452/189 |
| 6,371,314 B1 | * 4/2002 | Boisvert | 212/180 |

* cited by examiner

Primary Examiner—Charles T. Jordan
Assistant Examiner—Joan M. Olszewski
(74) Attorney, Agent, or Firm—Howard & Howard

(57) ABSTRACT

A game hoist and carrier comprises a rack having expandable sides for transporting game from a hunting site. A hoist mast is mounted to the rack, and a vertical support shaft is attached to the rack for stabilizing the game hoist and carrier above a surface during the lifting of an animal carcass.

13 Claims, 4 Drawing Sheets

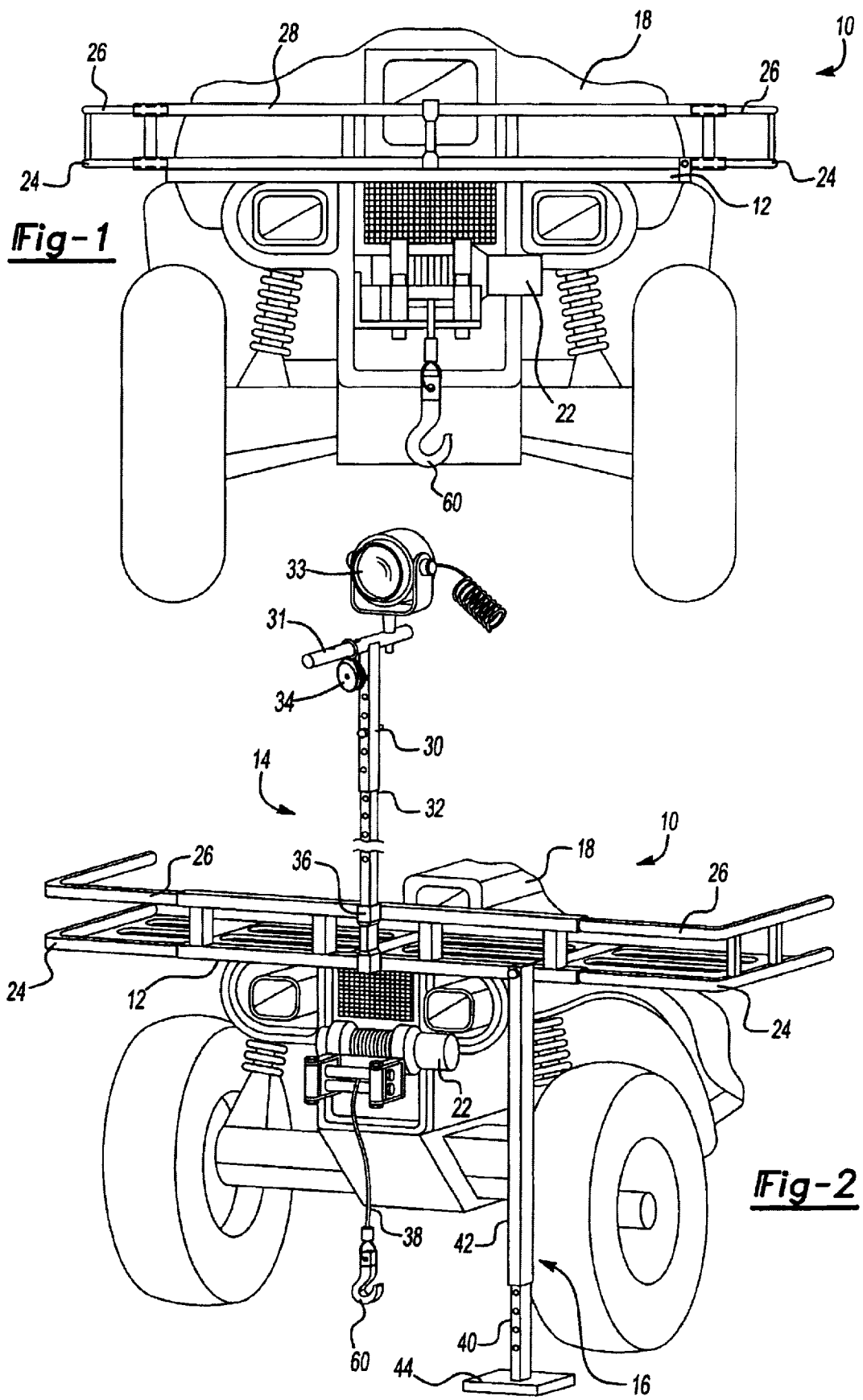

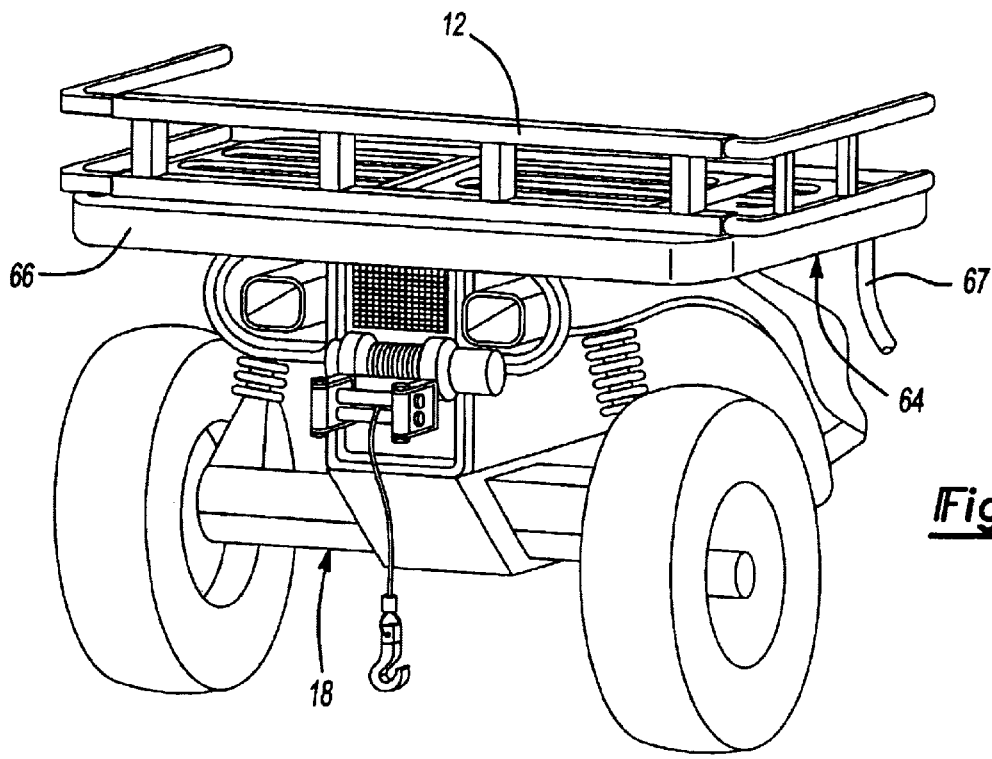
*Fig-5*
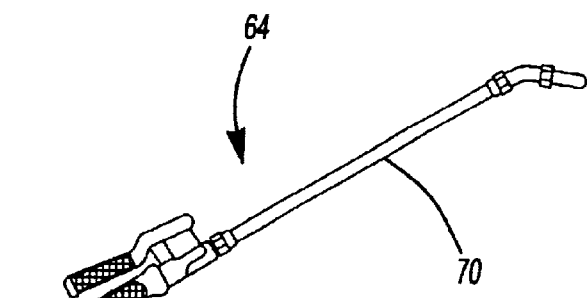
*Fig-6*
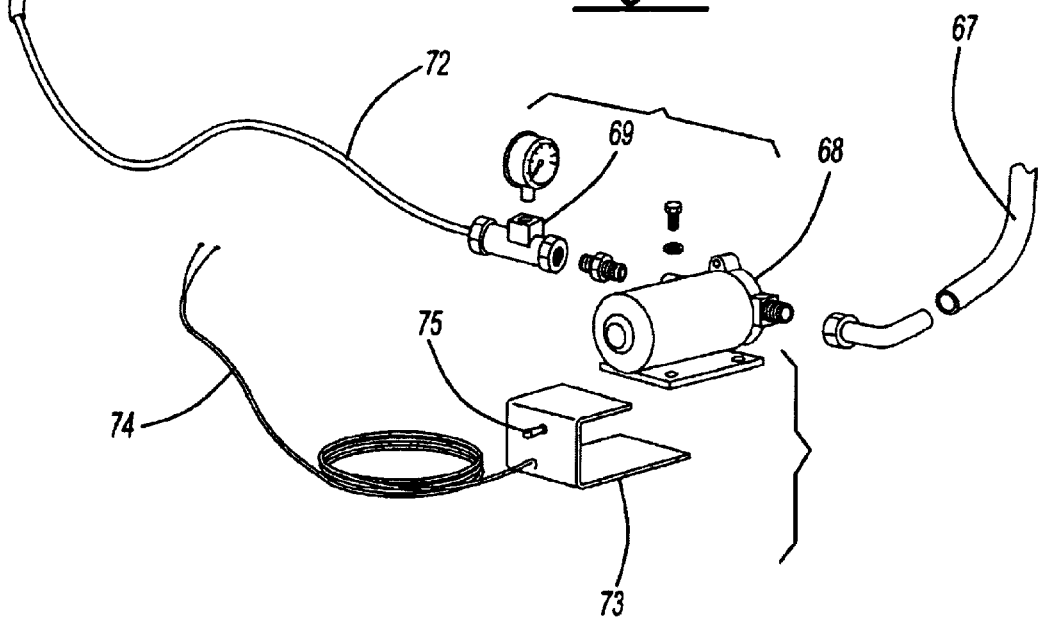

BIG GAME HOIST AND CARRIER ASSEMBLY

This application claims the benefit of U.S. Provisional Application No. 60/241,311, filed Oct. 18, 2000.

FIELD OF INVENTION

The present invention relates to an expandable front cargo rack mountable to an all terrain vehicle that incorporates a hoist mast used to lift, field dress, skin and load harvested deer sized game animal carcasses.

BACKGROUND OF THE INVENTION

While in the field, hunters immediately field dress, or gut, an animal carcass in order to prevent the meat from spoiling. To field dress an animal carcass the hunter typically hangs the animal carcass to allow the animal's body cavity to drain and cool. Normally, a gambrel and some rope are used to hang the carcass from a convenient tree. However, when hunting in brush, scrubland, cropland, or swampy areas, a convenient tree that can support the weight of a deer-sized animal carcass may not be available. For these reasons, hoists have been developed that attach to the hunter's vehicle. However, these hoists are adapted for use with dual-purpose vehicles that must be capable of traveling on paved roads as well as traveling off road. Such vehicles have limited mobility and must be left a considerable distance from the actual site where the animal is harvested. For this reason, the dressed animal must be dragged a considerable distance through rough terrain. As appreciated, dragging a large animal is quite a physical burden on the hunter. In addition, dragging the animal can lead to contamination of the meat and damage the hide or trophy head. Further, the time required for dragging the animal delays the draining and cooling of the carcass, which can lead to spoilage.

Therefore, it would be desirable for hunters to have a game hoist that is available at the actual hunting site. Further, a device to aid the hunter in transporting the animal carcass from the hunting site, without adding to the contamination of the meat, or damaging the hide or trophy head, would be beneficial.

SUMMARY OF INVENTION

One aspect of the present invention is a game hoist and carrier for mounting to and all-terrain vehicle having an electric winch. The game hoist and carrier comprises a rack having expandable sides for transporting game from a hunting site. A hoist mast is mounted to the rack, and a vertical support shaft is attached to the rack for stabilizing the game hoist and carrier above a surface during the lifting of an animal carcass.

Another aspect of the present invention is a gambrel for suspending an animal carcass above a surface. The gambrel comprises a first ring and a first wire rope affixed to the first ring. The wire rope having two lengths, each of the lengths depending from the first ring. A cross bar having a selectively adjustable width, the bar being attached to the lengths of the first wire rope and in combination therewith forming an adjustable loop at each end of said bar.

Yet another aspect of the present invention is a sling for suspending an animal carcass above a surface. The sling comprises a ring and a plurality of wire ropes attached thereto, each of the wire ropes extending from the ring and terminating in an adjustable noose.

These and other features, advantages and objects of the present invention will be further understood and appreciated by those skilled in the art by reference to the following specification, claims, and appended drawings.

BRIEF DESCRIPTION OF THE DRAWINGS

Advantages of the present invention will be readily appreciated, as the same becomes better understood by reference to the following detailed description when considered in connection with the accompanying drawings wherein:

FIG. 1 is front elevation view of a game hoist and carrier embodying the present invention in its travel configuration;

FIG. 2 is a perspective view of the game hoist and carrier configured for field dressing an animal carcass;

FIG. 5 is a front view of a flat water tank mounted below the carrier on the all-terrain vehicle for the carcass washing attachment;

FIG. 6 is an exploded view of the pump and spray wand assembly for the carcass washing attachment;

DETAILED DESCRIPTION OF THE PREFERRED EMBODIMENT

Figure 3:
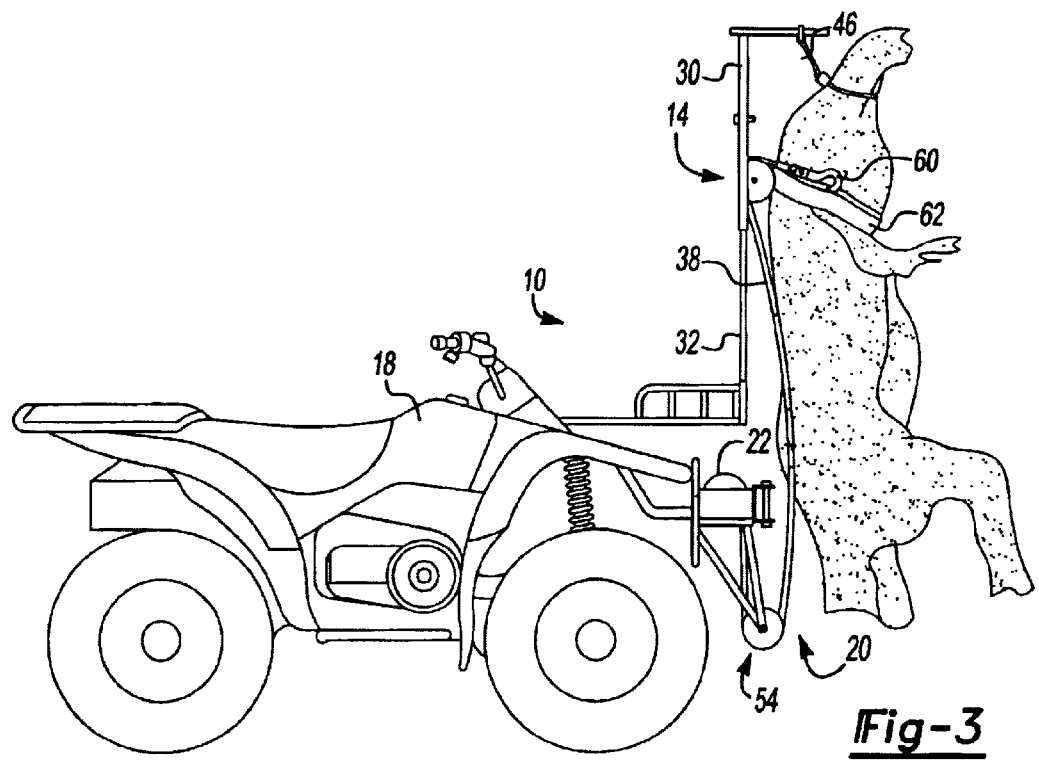
FIG. 3 is a side view of the ATV including the skinning attachment.

For purposes of description herein, the terms "upper", "lower", "left", "rear", "right", "front", "vertical", "horizontal", and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Referring to the Figures wherein like numerals indicate like or corresponding parts throughout the several views, a game hoist and carrier for mounting onto an all-terrain vehicle (ATV) is generally shown at 10. Referring to FIGS. 1 and 2, the game hoist and carrier 10 includes a rack 12 for transporting game from a hunting site, a hoist mast 14 for lifting and field dressing an animal carcass, and a vertical support 16 for stabilizing the ATV 18 during the hoisting of an animal. Optional attachments to the game hoist and carrier 10 include a skinning attachment 20 (FIG. 3) utilizing an ATV mounted winch 22 to skin the hide off the animal carcass and a water pack kit (FIGS. 5–6) for flushing a field dressed carcass. The hoist mast 14 and vertical support 16 are stowed within the rack 12 for transportation and all corners 24 of the rack 12 are radiused to prevent injury to a hunter should the ATV 18 turn over.

The rack 12 mounted to the front portion of the ATV 18 includes expandable sides 26 telescopically retained in fence 28. The expandable sides 26 slide outward from opposite ends of fence 28 to accommodate larger game, such as large deer sized animal carcasses. Fence 28 is a generally rectangular grid along a front portion of the rack 12 and expandable sides 26 partially extend around a perimeter of the rack 12 to protect the carcass from possible contaminating surfaces. The fence 28 aids the securing of items carried on the rack 12 and to prevent items from slipping forward while braking or traveling down inclines.

The game hoist and carrier 10 is attached to an existing front rack (not shown) of the ATV 18 using adapter kits for the specific make and model of ATV 18. Each model of ATV has a model specific, front rack configuration. The adapter kit for an ATV 18 equipped with a plastic rack includes standoffs that utilize the same mounting brackets for the plastic rack. The standoffs position the game hoist and carrier 10 approximate one inch above the existing plastic rack. Standoffs are supplied with the game hoist and carrier 10 when an ATV 18 is equipped with a metal tube rack from the manufacturer. The standoffs are used to clamp the game hoist and carrier 10 to the existing rack utilizing "U" bolts.

Those skilled in the art will appreciate that the aforementioned methods of attachment are for universal mounting of the game hoist and carrier 10. Game hoist and carrier 10 may be manufactured to be ATV model specific in order to reduce the gross weight of the ATV 18 on which it is installed.

A retaining clip and snap pin (snap pins are well known and are thus not shown to maintain clarity of the Figures) secures the hoist mast 14 in a stowed configuration on rack 12 during transportation. To erect the hoist mast 14, the hoist mast 14 is removed from its stowed position and is inserted into hoist mast receiver 36 in the center of the front of the rack 12. The hoist mast 14 includes an inside tube 32, which is received into the hoist mast receiver 36 and is secured in place by a snap pin through matching holes in hoist mast receiver 36 and inner tube 32. An outside tube 30 is telescopically received over inside tube 32. Outside tube 30 includes at an upper end a cross bar 31. The outside tube 30 is secured over the inside tube 32 at a desired position by any of several known methods, including, a pin extending through mating holes in tubes 30 and 32, a spring loaded pin affixed in one position in tube 32 extending through one or more holes in tube 30, a thumb screw, etc. In the preferred embodiment, a desired hoist mast height may be set to accommodate lifting the harvested game animal to a comfortable and convenient height for field dressing.

Figure 8:
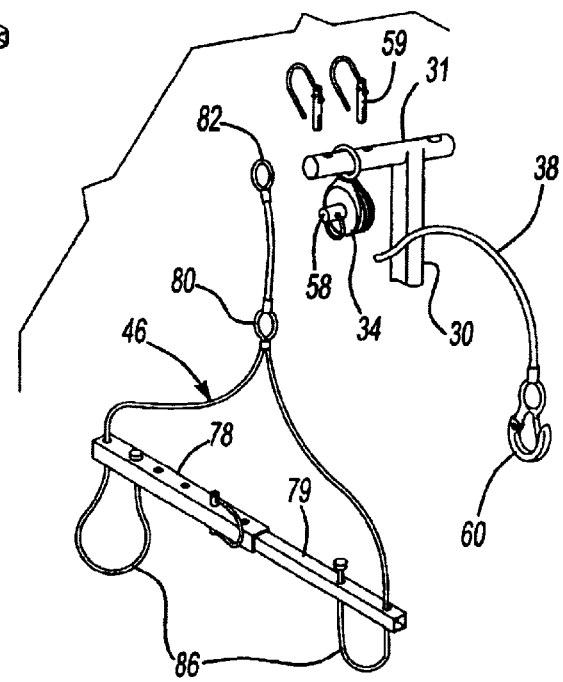
FIG. 8 is an exploded view of the gambrel and upper portion of the hoist.
Figure 9:
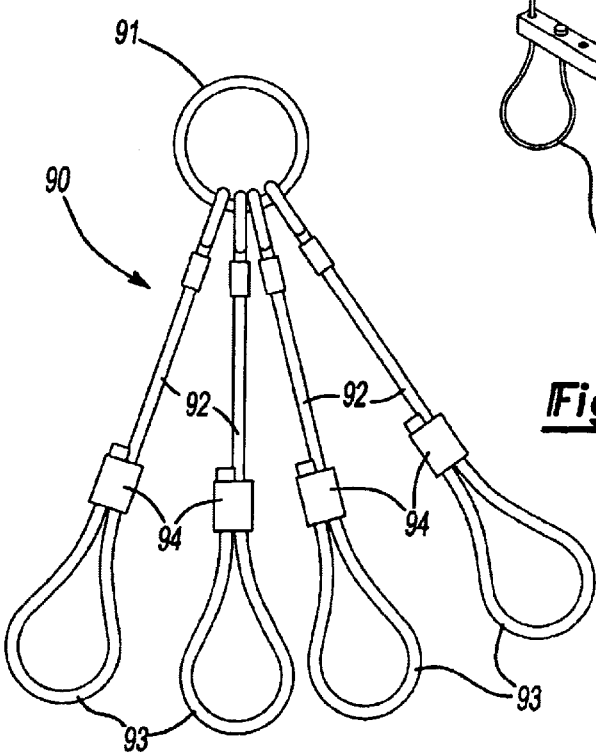
FIG. 9 is a carcass-lifting sling.

The hoist mast 14 works in cooperation with the ATV mounted electric cable winch 22. A winch cable snatch block or pulley 34 is disposed at an uppermost end of the outside tube 30 on cross bar 31. The winch cable 38 is threaded through the pulley 34 by removing a pulley pin 58, threading the cable 38 over the pulley 34, and reassembling the pulley pin 58 to the pulley 34 with the free end of the cable 38 hanging down (FIG. 8). The hoist mast 14 includes provisions for mounting a 12-volt electric spotlight 33 at one end of cross bar 31 to supply electric lighting should the hunter need to field dress a game animal after dark.

The two-piece vertical support shaft 16 pivotally attaches to the underside of rack 12 and prevents the tipping forward of the ATV 18 during lifting, field dressing and skinning of the harvested game animal. Two snap pins retain the vertical support shaft 16 under the rack 12 in a transportation position. The vertical support shaft 16 includes an inner tube 40 having a foot 44 pivotally secured to a bottom end is slidably disposed within an outer tube 42. The length of the telescoping vertical support shaft 16 is adjusted by sliding the inner tube 40 to a desired length, aligning matching holes, and inserting a snap pin into the mating indexing holes of inner and outer tubes 40 and 42.

Figure 4:
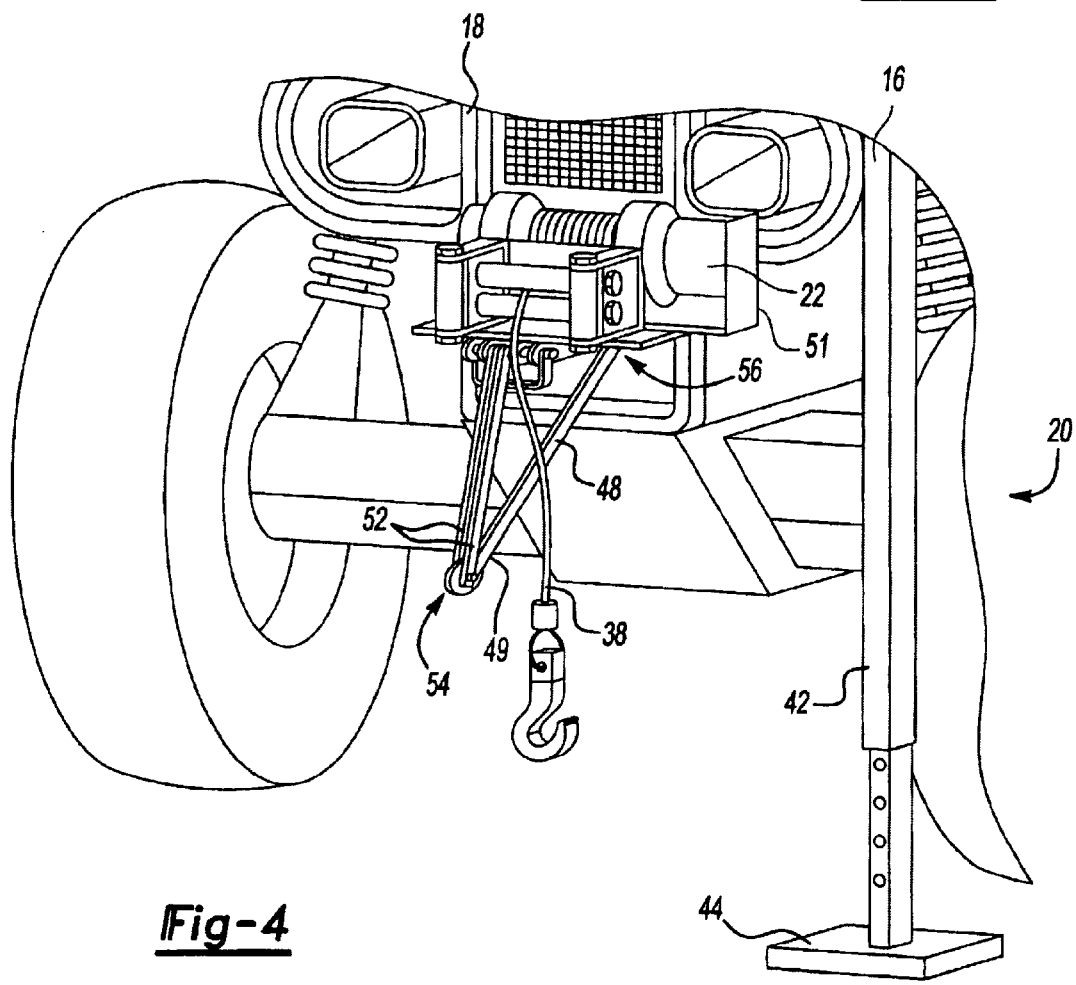
FIG. 4 is a perspective view of the skinning attachment mounted on the all-terrain vehicle.
Figure 7:
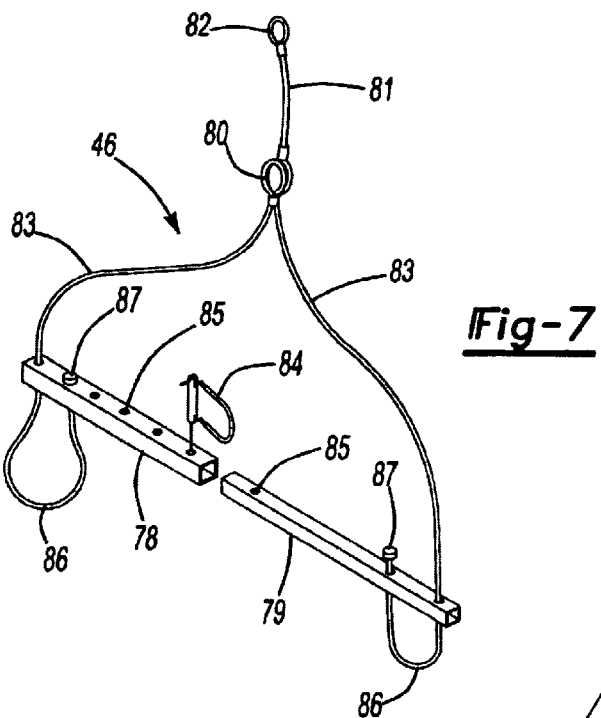
FIG. 7 is a perspective view of a gambrel for hoisting and suspending a carcass.

Referring to FIGS. 3 and 4, a skinning attachment 20 provides for the skinning of a deer-sized big game animal that has been field dressed. The skinning attachment 20 is used after the carcass has been hoisted with gambrel 46 around the hind legs of the animal. The skinning attachment 20 includes a base bracket 56, a first arm 48 having a clevis end 49, and support arms 52. The first arm 48 and support arms 52 are attached to the base bracket 56. A second pulley 54 is attached within the clevis end 49 of first arm 48 and between the support arms 52. A skinning strap 62 is provided to attach to the skin of the carcass and includes a loop for attaching a winch cable hook 60. The winch cable 38 threads through the clevis end 49 of first anti 48 and between the support arms 52 and passes around the second pulley 54. The winch cable hook 60 hooks the loop on skinning strap 62. The skinning strap 62 loops around a flap of skin loose from the animal carcass. The first arm 48, and support arms 52 and the base bracket 56 transfers all pulling force to the winch 22, the winch-mounting bracket 57 and vertical support shaft 16 to prevent damage to plastic sections of the ATV 18.

Referring to FIGS. 5 and 6, a carcass washing attachment 64 may be provided. The carcass washing attachment 64 provides for washing of residue from the carcass of the field dressed game animal after field dressing of the carcass. The carcass washing attachment 64 includes a water tank 66, a water pump 68, and a length of hose 67 extending from a bottom outlet in tank 66 to the inlet side of water pump 68. A second hose 72 attaches to the outlet side of water pump 68 and has affixed at the discharge end of hose 72 a spray wand 70. Wand 70 has a hand operated valve for selectively starting and stopping the water flow from discharging from wand 70 to flush the carcass at will. Preferably the water tank 66 is mounted between the existing factory install front rack of the ATV 18 and the rack 12. Those skilled in the art will appreciate that the water tank 66 may be mounted anywhere on the ATV 18. Adapter brackets (not shown) mount the rack 12 above the water tank 66. Preferably electric water pump 68 is mounted to a bracket 73 that can in turn be mounted on a convenient spot on ATV 18. Hose 67 being of sufficient length and trimmable to accommodate the specific placement of bracket 73 and pump 68. A toggle switch 75 is mounted to bracket 73 and is electrically connected with wires 74 to both pump 68 and the ATV electrical system for selectively applying electric power to pump 68. Optionally, a pressure gage 69 can be installed between pump 68 and wand 70 to monitor the pressure created by pump 68 in hose 72. Compressed air could also be used to discharge water contained in water tank 66 to hose 72 and wand 70.

An animal carcass lifting sling 90 is provided to aid the hunter for loading the carcass onto rack 12. The lifting sling 90 comprises of four wire rope loops 92 that are permanently attached at on end to a welded steel ring 91. The other end of each wire rope loop 92 is fashioned as a slip noose 93 with clamp 94 secured to an end of the wire rope and slidably received on an upper portion of the wire rope. One slip noose 93 is placed around each of the animal carcass's four legs above the knee and cinched tight while the animal carcass is lying on the ground. Winch cable hook 60 is hooked through the welded steel ring 91. The hunter then operates the electric winch 22 to lift the animal carcass onto the rack 12.

An adjustable cinch gambrel 46 is provided for field dressing and skinning the harvested animal carcass. The adjustable cinch gambrel 46 comprises of an outer tube 78 and an inner tube 79 with several indexing holes therein and a wire rope cinch 83 that attaches to the carcass's rear legs above the knees and has a lifting eye 80 for which to attach the winch cable hook 60. The wire rope cinch also has an addition eye 82 connected to lifting eye 80 by cable 81 that is used to suspend the animal carcass from cross bar 31 of hoist mast 14. Lifting eye 82 allows the hunter to lift the carcass to the desired height and slip the additional eye 82 over the cross bar 31, insert a snap pin 59 into a hole in the forward end of the cross bar 31. Once the eye is placed on cross bar 31, the winch cable hook 60 can be removed from the gambrel lifting eye 80. The hunter can then use the winch cable 38 and winch cable hook 60 for other purposes while the carcass is suspended on the hoist mast 14 such as using the skinning attachment 20 for removing the hide from the harvested animal carcass. Length of the gambrel 46 is adjusted by sliding the inner tube 79 within the outer tube 78 and then inserting a snap pin 84 through matching holes 85 to the desired length to accommodate the size of the harvested game animal.

The game animal is retained in gambrel 46 by placing one leg in each of loops 86. Each end 87 of the wire rope cinch 83 is affixed to the outer end of tubes 78 and 79, and the wire robe is then passed through a hole in the tube that is large enough to allow the wire rope to easily slide therein. The carcass is held in a suspended manner by its own weight pulling down on ends 87 thus decreasing the size of loops 86 to firmly retain the carcass. The gambrel 46 is easily removed once the hanging weight of the carcass is eliminated by sliding the wire rope through the holes in the tube to increase the size of loops 86.

The invention has been describe in an illustrative manner, and it is to be understood that the terminology, which has been used, is intended to be in the nature of words of description rather than of limitation. Many modifications and variations of the present invention are possible in light of the above teachings. It is therefore, to be understood that the invention may be practiced otherwise than as specifically described

I claim:

1. A game hoist and carrier for mounting to an all-terrain vehicle having an electric winch comprising:
   a rack having expandable sides for transporting game from a hunting site;
   a hoist mast mounted to said rack;
   a vertical support shaft attached to said rack for stabilizing said game hoist and carrier during the lifting of an animal carcass; and
   a gambrel placed at a top of said hoist for suspending an animal carcass therefrom, said gambrel comprising:
      a first ring;
      a first wire rope affixed to said first ring and having two lengths extending therefrom; each of said lengths depending from said first ring;
      a second wire rope having one end affixed to said first ring;
      a second ring affixed to an opposite end of said second wire rope; and
      a cross bar having a selectively adjustable width, said bar having a hole in each end thereof and each of said holes receiving in a slidable fashion one of said lengths of said first wire rope wherein an end of each length is affixed to said bar thereby forming an adjustable loop between said first wire rope and said bar at each end of said bar.

2. The game hoist and carrier according to claim 1 wherein said hoist mast is selectable between an erected position and a stowed position on said rack.

3. The game hoist and carrier according to claim 2 wherein said hoist mast comprises an inner tube telescoping within an outer tube.

4. The game hoist and carrier according to claim 3 wherein said hoist mast is selectively adjustable to vary the height of a top of said hoist mast.

5. The game hoist and carrier according to claim 4 wherein said hoist mast further comprises a cross bar mounted at a top of an uppermost of said telescoping tubes.

6. The game hoist and carrier according to claim 5 wherein said cross bar extends from said uppermost tube in a cantilevered fashion.

7. The game hoist and carrier according to claim 6 further including a pulley disposed on said cross bar for receiving a winch cable therethrough.

8. The game hoist and carrier according to claim 1 further including a support bar affixed to said rack and adjustable to extend from a ground surface to said rack to support a portion of said rack above the ground surface.

9. The game hoist and carrier according to claim 8 wherein said support bar is pivotally affixed to said rack and is selectively pivotable between a stowed position and an use position and further included a foot pad pivotally affixed at a lower extremity thereof for bearing on the ground surface.

10. A gambrel for suspending an animal carcass above a surface, said gambrel comprising:
    a first ring;
    a first wire rope affixed to said first ring and having two lengths extending therefrom; each of said lengths depending from said first ring; and
    a cross bar having a selectively adjustable width, said bar being attached to said lengths of said first wire rope and in combination therewith forming an adjustable loop at each end of said bar wherein each of said adjustable loops is formed by one of said lengths of said first wire rope slidably received and extending through a hole at one end of said cross bar, said length of wire rope having a free end thereof affixed to said cross bar, said loop adjustable by sliding said length of said first wire rope within said hole at said end of said cross bar.

11. A gambrel according to claim 10 further including:
    a second wire rope having one end affixed to said first ring; and
    a second ring affixed to an opposite end of said second wire rope.

12. A gambrel according to claim 11 wherein said cross bar further comprises a first tube telescopically coupled with a second tube, and affixable in a plurality of widths.

13. A gambrel according to claim 12 wherein said first tube defines a plurality of spaced holes therealong, and said second tube defines at least one hole therein, and further including a pin received in one of said holes in said first tube and also received in said hole in said second tube to affix said bar at a desired width.

* * * * *